United States Patent [19]
Tenney et al.

[11] Patent Number: 5,115,041
[45] Date of Patent: May 19, 1992

[54] SUBSTRATE FOR OPTICAL RECORDING MEDIA AND MOLDING COMPOSITION THEREFOR

[75] Inventors: Linwood P. Tenney, Birmingham, Ala.; Dennis C. Shen, Brecksville, Ohio

[73] Assignee: The B. F. Goodrich Company, Akron, Ohio

[21] Appl. No.: 331,310

[22] Filed: Mar. 31, 1989

[51] Int. Cl.$^5$ ................................................ C08F 8/04
[52] U.S. Cl. .............................. 525/332.1; 525/331.7; 525/338; 525/339
[58] Field of Search ........................... 525/331.7, 332.1

[56] References Cited

U.S. PATENT DOCUMENTS

| | | |
|---|---|---|
| 3,557,072 | 1/1971 | Verne et al. |
| 4,136,247 | 1/1979 | Tenney et al. |
| 4,136,248 | 1/1979 | Tenney |
| 4,136,249 | 1/1979 | Tenney et al. |
| 4,178,424 | 12/1979 | Tenney et al. |

FOREIGN PATENT DOCUMENTS

| | | |
|---|---|---|
| 58-43412 | 9/1983 | Japan |
| 60-26024 | 2/1985 | Japan |

OTHER PUBLICATIONS

Chemical Abstrct 107:9784n. Acrylic Polymers for Optical Materials (1988).

*Primary Examiner*—Bernard Lipman
*Attorney, Agent, or Firm*—Venable, Baetjer, Howard & Civiletti

[57] ABSTRACT

Substantially optically clear molding compositions comprising polymerized cycloolefin monomers (e.g., norbornene-type polymers) which, subsequent to polymerization have been hydrogenated are provided. The polymers have a weight average molecular weight of from about $37-47 \times 10^3$.

11 Claims, No Drawings

SUBSTRATE FOR OPTICAL RECORDING MEDIA AND MOLDING COMPOSITION THEREFOR

BACKGROUND OF THE INVENTION

This invention relates to optical elements, such as optical recording media, e.g., optical discs, to methods for producing such discs and to molding compositions for producing them. Articles such as optical discs have generally been made from materials such as polycarbonates or polymethylmethacrylates. In recent times attempts have been made to produce such articles from ring-opened polymers. In order to obtain reasonable optical clarity, it was necessary to hydrogenate such polymers subsequent to polymerization. However, such polymers have not proved entirely suitable for use in optical applications. For example, molded products of such polymers do not exhibit an optimal spectrum of properties, such as good birefringence, melt-flow properties, and related properties which may render them not as suitable for use in optical applications as are already accepted polymers, e.g., the polycarbonate polymers discussed above.

Polymers obtained by the ring-opening polymerization of cycloolefins are well known. For example, U.S. Pat. Nos. 4,136,247; 4,136,248; 4,136,249 and 4,178,424, all assigned to the B. F. Goodrich Company, describe such polymers and their preparation and each is incorporated herein by reference.

The ring-opening polymerization of cycloolefins produces unsaturated polycycloolefins. Polycycloolefins obtained from polycycloolefin monomers, i.e., monomers containing more than one ring structure, e.g., dicyclopentadiene, are of particular interest. Monomers such as dicyclopentadiene provide a 1,3-cyclopentene repeat structure in the polymer, which is obtained by a ring-opening polymerization and cannot be obtained by addition polymerization. These unsaturated polymers are known to be reactive (sulphur vulcanizable) and they are known to exhibit a profile of properties suitable for, e.g., automotive parts, such as decorative trim.

It is known that saturated hydrocarbon polymers, e.g., polypropylene and polyethylene, exhibit improved dielectric properties, hydrolytic stability, oxidative stability, and reduced water absorption when compared to polymers containing ester, amide, alcohol and other functional groups. The dielectric properties of such saturated polymers are desirable for electrical applications when used as insulators. The high oxidative stability of saturated hydrocarbon polymers renders them particularly desirable for applications in harsh environments, as does their hydrolytic stability. When unsaturated polymers are saturated, i.e., when saturated polymers are prepared from unsaturated polymers, the saturated polymers exhibit a dramatic improvement in oxidative stability. However, often that improvement is attained at the expense of a significant reduction in the heat distortion temperature for the saturated derivatives of the unsaturated hydrocarbon polymers. This reduction in heat distortion temperature may often render the polymers thermally inadequate for end-use in electrical and electro-optical systems, despite an improvement in oxidative stability.

Generally, saturated derivatives of ring-opened polymerized cycloolefins exhibit lower glass transition temperatures, and thus lower heat distortion temperatures than their unsaturated precursors. Hydrogenated polymers of certain cycloolefins have been employed, either in blends, or in particular applications as homopolymers or copolymers. For example, Japanese Kokai Patent No. 60[1985]-26024 discloses hydrogenated "cracked" homopolymers of tetracyclododecene and its copolymers with bicyclic norbornene. These polymers are disclosed as being useful for optical materials having good transparency, water-proofness (low water absorption), and heat resistance, which renders them suitable for compact discs, video discs, computer discs, etc.. However, if the teachings of this document are employed to produce polymers disclosed therein, a product exhibiting an inferior spectrum of properties results. For example, high glass transition temperatures needed for certain applications cannot be obtained with these copolymers without sacrificing other properties. Moreover, in addition to the fact that tetracyclododecene is a relatively expensive monomer to make, the materials of this patent do not exhibit optimized properties.

Japanese Kokoku Patent No. Sho. 58[1983]-43412 discloses hydrogenated homopolymers of dicyclopentadiene wherein the dicyclopentadiene is first "cracked" and polymerized, followed by hydrogenation. The resultant polymers are disclosed as having improved solvent resistance. Methods for hydrogenating the dicyclopentadiene polymers are provided and methods for polymerization are shown in the examples.

Thus, although attempts have been made to prepare optical materials with saturated polynorbornene-type polymers, the art still lacks such materials which exhibit an optimum spectrum of properties. There has been a continuing need for improvement.

U.S. Pat. No. 3,557,072 discloses nonhydrogenated polynorbornenes of general interest which may be of use in applications wherein a transparent polymer is desired.

SUMMARY OF THE INVENTION

It is an object of this invention to provide substrates for optical discs having an improved spectrum of properties, for example, improved birefringence, melt-flow indices, dilute solution viscosities, molecular weights, etc., as well as improved optical properties and stability to conditions encountered in the environments in which they will be used.

These and other objects have been attained by providing substantially clear molding compositions comprising hydrogenated polynorbornenes derived from at least one norbornene or norbornene derivative or mixture thereof and having a molecular weight of from about $35-50 \times 10^3$, preferably about $37-47 \times 10^3$. As used herein, molecular weight refers to weight average molecular weight. The polynorbornenes have a moisture absorption of from about 0.01–0.1 %, preferably about 0.02–0.05%, a retardation (birefringence) of from about 10–80 nm, preferably about 10–30 nm, a glass transition temperature (Tg) of from about 110°–160° C., preferably from about 130°–140° C., a melt-flow index of from about 20–65, preferably about 35–55 and most preferably about 47 to about 51; (1200g/300° C.), and an M-scale hardness of from about 80–130, preferably about 100–110, and improved polymer/metal adhesion.

In some preferred embodiments, this invention provides terpolymers derived from monomer mixtures comprising methyltetracyclododecene, methylnorbornene and dicyclopentadiene.

In a process aspect, this invention provides processes for forming a substantially optically clear molding composition comprising polymerizing a monomer of a norbornene or norbornene derivative, or a mixture thereof, in the presence of a catalyst effective to promote ring-opening polymerization to produce a ring-opened polynorbornene. The resultant polymer is then hydrogenated to form a substantially optically clear polymer having a molecular weight of from about $35-50 \times 10^3$. In another aspect, polymers produced by such processes are provided.

The invention also provides optical discs and other optical media produced by such processes, as well as processes for producing such optical media.

DETAILED DESCRIPTION OF THE INVENTION

The polynorbornenes of this invention are derived from cycloolefin monomers. These cycloolefin monomers are characterized by the presence of at least one norbornene moiety having the general structure identified below:

This structure may be substituted or unsubstituted. Suitable cycloolefin monomers include substituted and unsubstituted norbornenes, dicyclopentadienes, dihydrodicyclopentadienes, trimer of cyclopentadiene, tetracyclododecenes, hexacycloheptadecenes, ethylidenyl norbornenes and vinylnorbornenes. Substituents on the cycloolefin monomers include hydrogen, alkyl, alkenyl, and aryl groups of 1 to 20 carbon atoms and saturated and unsaturated cyclic groups of 3 to 12 carbon atoms which can be formed with one or more, preferably two, ring carbon atoms. In a preferred embodiment, the substituents are selected from hydrogen and alkyl groups of 1 to 2 carbon atoms. Generally speaking, the substituents on the cycloolefin monomers can be any which do not poison or deactivate the polymerization catalyst. Examples of the preferred monomers referred to herein include
dicyclopentadiene,
methyltetracyclododecene,
2-norbornene,
and other norbornene monomers such as
5-methyl-2-norbornene,
5,6-dimethyl-2-norbornene,
5-ethyl-2-norbornene,
5-ethylidenyl-2-norbornene (or 5-ethylidene-norbornene),
5-butyl-2-norbornene,
5-hexyl-2-norbornene,
5-octyl-2-norbornene,
5-phenyl-2-norbornene,
5-dodecyl-2-norbornene,
5-isobutyl-2-norbornene,
5-octadecyl-2-norbornene,
5-isopropyl-2-norbornene,
5-phenyl-2-norbornene,
5-p-toluyl-2-norbornene,
5-α-naphthyl-2-norbornene,
5-cyclohexyl-2-norbornene,
5-isopropenyl-norbornene,
5-vinyl-norbornene,
5,5-dimethyl-2-norbornene,
tricyclopentadiene (or cyclopentadiene trimer),
tetracyclopentadiene (or cyclopentadiene tetramer),
dihydrodicyclopentadiene (or cyclopentene-cyclopentadiene co-dimer),
methyl - cyclopentadiene dimer,
ethyl - cyclopentadiene dimer,
tetracyclododecene
9-methyl-tetracyclo$[6,2,1,1^{3,6},0^{2,7}]$dodecene-4, (or methyl-tetracyclododecene)
9-ethyl-tetracyclo$[6,2,1,1^{3,6},0^{2,7}]$dodecene-4, (or ethyl-tetracyclododecene)
9-hexyl-tetracyclo$[6,2,1,1^{3,6},0^{2,7}]$dodecene-4,
9-decyl-tetracyclo$[6,2,1,1^{3,6},0^{2,7}]$dodecene-4,
9,10-dimethyl-tetracyclo$[6,2,1,1^{3,6},0^{2,7}]$dodecene-4, 9-methyl,10-ethyl-tetracyclo$[6,2,1,1^{3,6},0^{2,7}]$ dodecene-4,
9-cyclohexyl-tetracyclo$[6,2,1,1^{3,6},0^{2,7}]$dodecene-4,
9-chloro-tetracyclo$[6,2,1,1^{3,6},0^{2,7}]$dodecene-4,
9-bromo-tetracyclo$[6,2,1,1^{3,6},0^{2,7}]$dodecene-4,
9-fluoro-tetracyclo$[6,2,1,1^{3,6},0^{2,7}]$dodecene-4,
9-isobutyl-tetracyclo$[6,2,1,1^{3,6},0^{2,7}]$dodecene-4,
9,10-dichloro-tetracyclo$[6,2,1,1^{3,6},0^{2,7}]$dodecene-4, Polymers comprising two or more different types of monomeric units are especially preferred. For example, copolymers of methyltetracyclododecane (hereinafter referred to as MTD) and methylnorbornene (hereinafter referred to as MNB) are especially suitable.

Even more preferably, the polymers of this invention comprise three or more different types of monomeric units, eg., terpolymers. These preferred terpolymers comprise MTD, MNB and dicyclopentadiene (hereinafter referred to as DCPD). For ease in illustration, the MTD component is designated component A, the MNB component is designated B and the DCPD component is designated C. Suitable components A (MTD-type components) are norbornene-type units derived from norbornene-type monomers having 4-6 rings. Suitable component A-type monomers can be selected from the list above. Suitable component B-type monomers (MNB-type monomers) are derived from substituted and unsubstituted norbornenes. Examples include alkyl-norbornenes, eg., methylnorbornene. Suitable B-type monomers can be selected from the list above. Suitable C-type monomers (DCPD-type monomers) include substituted and unsubstituted dicyclopentadiene. Examples include alkyldicyclopentadiene, eg., methyldicyclopentadiene. The polymers of this invention can exist in the endo- or exo- form and a polymer backbone of this invention can contain both endo- and exo- forms of monomeric units.

Preferred copolymer and terpolymer compositions are listed below:

| A<br>MTD | B<br>MNB | C<br>DCPD |
| --- | --- | --- |
| 50-95% | 0-15% | 0-50% |
| 50-90% | 2-10% | 1-40% |
| 85-90% | 3-10% | 2-10% |

In the above table, all percentages are by weight.

An especially preferred terpolymer composition comprises 90% methyltetracyclododecene, 7% methylnorbornene and 3% dicyclopentadiene.

Other monomers can form part of the polynorbornenes such as non-conjugated acyclic olefins, monocyclic olefins and diolefins. The non-conjugated acyclic olefins act as chain terminators. Hexene-1 is preferred while 1-butene, 2-pentene, 4-methyl-2-pentene, and 5-ethyl-3-octene are suitable also. They are typically used at a molar ratio of 0.001:1 to 0.5:1 acyclic olefin to cycloolefin monomer.

The polynorbornenes used in this invention are obtained by solution polymerization. For solution polymerization, the catalyst preferably comprises molybdenum or tungsten salts and the co-catalyst preferably comprises dialkylaluminum halides, alkylaluminum dihalides, alkylalkoxy halides or a mixture of trialkylaluminum with an iodine source.

Examples of useful molybdenum and tungsten salts include the halides such as chlorides, bromides, iodides, and fluorides. Specific examples of such halides include molybdenum pentachloride, molybdenum hexachloride, molybdenum pentabromide, molybdenum hexabromide, molybdenum pentaiodide, molybdenum hexafluoride, tungsten hexachloride, tungsten hexafluoride and the like. Other representative salts include those of acetylacetonates, sulfates, phosphates, nitrates, and the like. Mixtures of salts can also be used. For optimal polymerization results, the more preferred salts are the molybdenum halides, especially molybdenum pentahalides such as $MoCl_5$.

Specific examples of co-catalysts for ring-opening solution polymerization include alkyl-aluminum halides such as ethylaluminum sesquichloride, diethylaluminum chloride, diethylaluminum iodide, ethylaluminum diiodide, propylaluminum diiodide and ethylpropylaluminum iodide and a mixture of triethylaluminum and elemental iodine.

For solution polymerization, the molybdenum or tungsten salt is generally employed at a level of from about 0.01 to about 50 millimoles per mole of total monomer, preferably from about 0.5 to about 10 millimoles per mole of total monomer and the organoaluminum compounds described above are generally used in a molar ratio of organoaluminum compound to molybdenum and/or tungsten salt(s) of from about 10/1 to about 1/3, preferably from about 5/1 to about 3/1. Both catalyst and co-catalyst for solution polymerization are normally added after the heating and at the time of polymerization.

Suitable solvents used for the solution polymerization include aliphatic and cycloaliphatic hydrocarbon solvents containing 4 to 10 carbon atoms such as cyclohexane, cyclooctane and the like; aromatic hydrocarbon solvents containing 6 to 14 carbon atoms which are liquid or easily liquified such as benzene, toluene, xylene and the like; and substituted hydrocarbons wherein the substituents are inert such as dichloromethane, chloroform, chlorobenzene, dichlorobenzene and the like. Optionally present within the solution are curing agents which initiate radical crosslinking such as the peroxides, di-t-butyl peroxide, or 2,5-dimethyl-2,5-di(t-butylperoxy)-hexyne-3. Antioxidants such as hindered phenol antioxidants, Irganox 1010 and polyunsaturated monomeric or oligomeric crosslinkers such as trimethylol propane triacrylate are also optional.

The polynorbornenes prepared as above are subsequently hydrogenated. The hydrogenation is fully conventional and well-known to those of ordinary skill in the art.

Hydrogenation of the ring-opened polymers may be accomplished within the ring-opening polymerization solution without isolating the unsaturated intermediate ring-opened polymers. Alternatively, the polymers may be isolated from the polymerization solution by conventional procedures such as coagulation with a nonsolvent followed by filtration. Hydrogenation may proceed within solvents such as benzene, toluene, cyclohexane, chlorobenzene or mixtures of such solvents. The hydrogenated polymers can be isolated from these solvents by conventional isolation procedures such as coagulation followed by filtration. The isolated polymers can be dried and processed, as desired, into molded articles.

Hydrogenation of the ring-opened polymerized polymers may be accomplished by any conventional method used for olefin hydrogenation. The use of transition metal catalysts for olefin hydrogenation is well-known in the art as indicated by Kirk-Othmer in *Encyclopedia of Chemical Technology*, 6, (1978), pp. 583-584. James discusses a series of transition metal catalysts in *Advancements in Organometallic Chemistry*, 17 (1979) 319. In addition, Kirk-Othmer describes transition metal catalysts suitable for hydrogenation in the *Encyclopedia of Chemical Technology* (1978) at volume 6, page 793 and volume 4, page 842, which include nickel, cobalt, platinum, palladium, chromium, zinc, rhodium and molybdenum. The portions of the *Encyclopedia of Chemical Technology* referred to above are incorporated herein by reference for their discussion of hydrogenation catalysts and hydrogenation procedures. Complexes of these transition metals are utilized to provide catalysts for a hydrogenation reaction within a homogeneous system.

The preferred hydrogenation catalysts for these polymers are nickel complexes used in conjunction with alkylaluminum co-catalysts. Alternatively, nickel, platinum or platinum on a support such as carbon, calcium carbonate or silica are also excellent hydrogenation catalysts for these polymers, as is lithium aluminumhydride or diimides. Hydrogen is passed through the catalyst solution to obtain reduction of the polymers and saturation of the olefinic carbons. It is preferable to maintain the solution under an inert atmosphere, such as nitrogen or argon to prevent the loss of catalyst activity. Hydrogenation may proceed at preferred temperatures of from 100°-200° C.

Hydrogenation of the olefinic groups may be substantially complete or only a portion of these groups may be hydrogenated. Preferably, at least 50% of the olefinic groups are saturated by hydrogenation. Hydrogenation imparts greater oxidative stability to the polymers. The hydrogenated products have improved electrical properties and exhibit high heat distortion temperatures, although the glass transition temperature is below those of the unsaturated ring-opened precursors. The reduction in glass transition temperature is acceptable for many optical applications.

The polymers of this invention exhibit superior properties with respect to those of importance for materials employed in, for example, environments to which optical discs are subjected. Thus, the polymers of this invention exhibit an improved spectrum of properties including thermal stability, moisture absorption, retardation (birefringence), glass transition temperature, melt-flow properties, stress-optical properties, density, improved polymer/metal adhesion and greater hardness. An example of how polymers of this invention compare to polycarbonates conventionally employed in optical discs is set forth in Table I below.

TABLE I

Comparison of PNB versus Polycarbonate

| | PNB | PC |
|---|---|---|
| Moisture Absorption | 0.03% | 0.2% |
| Retardation (birefringence) | 20 nm | 60 nm |
| Tg | 133° C. | 138° C. |
| Density, g/ml | 1.03 | 1.3 |
| Melt Flow 1200 g/300° C. | 50, g/10 min. | 64 g/10 min. |
| Polymer/Metal Adhesion | Better | |
| Hardness (M Scale) | 110 | 45 |

In particular, the polymers of this invention exhibit improved melt-flow characteristics. This is significant, because the melt-flow properties of a polymer, and therefore the resultant polymeric molding composition, have an important impact on the optical properties of the resultant molded articles. It is believed that the improved melt-flow properties of the polymers of this invention allow the polymer to flow into the mold during a molding operation with less stress and that the resultant polymer therefore exhibits improved birefringence.

It is believed that, at least in part, the improved melt-flow properties of this invention are related to the molecular weights exhibited by the polymers of this invention. The polymers of this invention having molecular weights of, e.g., about $35 \times 10^3$ to about $58 \times 10^3$ exhibit markedly improved melt-flow properties in comparison with the polymers outside of this molecular weight range. Polymers inside the range exhibit melt-flow properties wherein the melt-flow index of the polymers is at least about 40g per 10 minutes at 1200g/300° C.

There is a similar relationship between dilute solution viscosity (DSV) and melt flow. When dilute solution viscosities of the polymers are lower than about 0.45, high melt-flow properties are attained, e.g., melt-flow indexes of at least about 40.

The dilute solution viscosity is determined on a viscometer by standard procedures. The polynorbornene polymer is weighed out on an analytical balance and dissolved in 50 ml of cyclohexane. An amount of from 0.049 to 0.051 milligrams of polymer is employed. This solution is then transferred to a four ounce screw-cap bottle. The bottle is then placed on a shaker for, e.g., 2 hours (overnight). Subsequently, the polymer solution is filtered through a B or C grade fritted glass funnel. Twenty-five grams of the filtered solution are pipetted into a previously weighed aluminum pan. The aluminum pan is placed on a steam plate and the polymer solution is evaporated to dryness. The aluminum pan is cooled and reweighed with the remains of the evaporated solution to determine the true concentration of the solution. Five milliliters of the filtered polymer solution prepared above is then pipetted into an Ostwald capilary-type viscometer. This viscometer is thoroughly conventional and those of ordinary skill in the art can readily employ such viscometers to determine dilute solution viscosities. The viscometer is placed in a constant-temperature bath at, eg., 25° C.±0.1° C. The flow time of the solution is determined to the closest 0.1 second. The flow time of the pure solvent is also determined. The dilute solution viscosity is then calculated according to the following formula.

$$D.S.V. = 2.3 \times \frac{\log \frac{T_s}{T_o}}{C}$$

where:
$T_s$ = time of flow of solution $T_o$ = time of flow of solvent
$C$ = concentration of solution The melt flow index values or melt flow rate is measured on a Tinus Olsen Thermodyne apparatus. In this system, a polynorbornene sample is extruded through a die by a weighted piston. The piston, is 0.376 inches in diameter. The die is 0.315 inches long and 0.376 inches in diameter having a center hole of 0.0825 inches in diameter. In use, the apparatus is preheated to 300° C. and upon equilibrium, 10 grams of polymer is charged to the barrel. The polymer is preheated for five minutes. After the polymer is preheated, a total of 1,200 grams of pressure, including the weight of the piston, is applied to the sample. Samples of the extrudate are collected for every ten seconds until the entire 10 grams of polymer is exhausted. The samples are weighed on an analytical balance. The weights are recorded and multiplied by 60 for melt flow rate, grams for 10 minutes.

To measure birefringence (retardation), sample disks are cast from the polymer. Birefringence of the sample disk is measured by the use of a Carl Zeiss refractometer with white light, since the difference in retardation between 550 and 630 nanometers (nm) is low (less than 2%). The calculation of retardation is made from a conventionally available table of values at a wavelength of 546.1 nm. The difference in retardation between 550 and 546.1 nm would be nominal. The value is measured with the sample disk at the 45 degree position in order to find the characteristic retardation. A typical double pass method measures an average retardation from an unoriented sample, giving rise to lower values. Since a single pass method is employed, the retardation value is doubled. The retardation value is reported in nm. Birefringence is calculated as retardation divided by thickness, where the thickness is measured in nm.

The glass transition temperature is determined with a calorimeter. Preferably a Dupont 910 Differential Scanning Calorimeter is employed. From ten to twelve milligrams of the polymer is placed into an aluminum pan and crimped. The crimped sample is placed on the raised platform of the heating module. The heating module is purged by pressurized nitrogen for a specified time before the test is begun. The starting temperature is about 40° C. with a heating rate of 20° C. per minute. The results of heat flow versus temperature are recorded and the temperature at the peak of the curve is recorded as the glass transition temperature.

The water absorption properties of the polymers of this invention are determined by ASTM D-570; the Rockwell hardness is determined by ASTM D-785 and the density is determined by ASTM D-792. These standards are hereby incorporated by reference herein.

EXAMPLE 1

Preparation of Hydrogenated
Methyl-tetracyclododecene
(MTD)/Dicyclopentadiene (DCPD) 90/10 Copolymer The following pilot plant procedure was used to prepare a hydrogenated MTD/DCPD copolymer. A feedblend consisting of 4.7 lbs. of DCPD (99% purity), 42.3 lbs. of MTD (98.5% purity), 66.9 lbs. of hexene-1 and 193.1 lbs. of cyclohexane was prepared and charged through a 3 Å molecular sieve column into a conditioned 50-gallon polymerization reactor. Then 0.23 lbs. of a 25% ethylaluminum sesquichloride in toluene solution and 1.55 lbs. of molybdenum pentachloride solution containing 1.6% MoCl dissolved in a 75/25 toluene-/ethylacetate solution was charged to the reactor. An exothermic ring-opening polymerization occurred immediately and the reaction temperature increased from 80° F. to about 135° F. The reaction was allowed to proceed for 30 minutes and the polymer solution was transferred to a 50-gallon hydrogenation reactor which contained 2.2 lbs. of a Harshaw Ni 5132 P hydrogenation catalyst (65% Ni on silica-alumina support) and 4.5 lbs. of Celite 500/503 filter aid. The reactor was pressurized with 50 psig of hydrogen and heated to 100° C. The reactor temperature was controlled between 100° C. and 130° C. After about two hours, the hydrogen pressure was increased to 300 psig for another hour. The polymer solution was then filtered (0.4 micron) to remove the hydrogenation catalyst and filter aid. Mark 2112 antioxidant (0.1 part/100 polymer) was added to the polymer solution. Infrared analysis showed the polymer contained less than 0.1% trans-unsaturation.

The polymer solution was extracted with 30 parts of a isopropanol/water 88/12 w/w solution and the polymer was isolated by steam stripping. The fine polymer crumb was dried for 36 hours in a 80° C. vacuum tray drier.

Four runs were made using the procedure shown above and the polymer crumb blended together gave a 141 lb. lot of polymer which was processed through a devolatilization twin-screw extruder at zone temperatures of 150° C.–300° C. to yield 130 lb. lot of polymer in the form of clean clear, colorless pellets. The polymer had the following physical properties: DSV=0.43, Tg=151° C., 0.0% residual weight loss at 450° C. and a melt-flow of 23 gms/min.

EXAMPLE II

Hydrogenated Methyl-teracyclododecene (MTD)/Methylnorbornene (MNB) 90/10 Copolymer The following pilot plant procedure was used to prepare a hydrogenated MTD/DCPD copolymer. A feedblend consisting of 4.6 lbs. of MNB (99% purity), 42.1 lbs. of MTD (98.5% purity), 74.7 lbs. of hexene-1 and 183.6 lbs. of cyclohexane was prepared and charged through a 3 Å molecular sieve column into a conditioned 50-gallon polymerization reactor. Then 0.23 lbs. of a 25% ethylaluminum sesquichloride in toluene solution and 1.59 lbs. of molybdenum pentachloride solution containing 1.6% $MoCl_5$ dissolved in a 75/25 toluene-/ethylacetate solution was charged to the reactor. An exothermic ring-opening polymerization occurred immediately and the reaction temperature increased from 80° F. to about 135° F. The reaction was allowed to proceed for 30 minutes. Irganox 1010 antioxidant at a level of 1 part/100 polymer was added to the reactor. The polymer solution was transferred to a 50-gallon hydrogenation reactor which contained 2.1 lbs of a Harshaw Ni 5132 P hydrogenation catalyst (65% Ni on silica-alumina support) and 4.5 lbs. of Celite 500/503 filter aid. The reactor was pressurized with 50 psig of hydrogen and heated to 100° C. The reactor temperature was controlled between 100° C. and 130° C. After about two hours the hydrogen pressure was increased to 300 psig for another hour. The polymer solution was then filtered (1.0 micron) to remove the hydrogenation catalyst and filter aid. An additional 1 phr Irganox 1010 antioxidant was added to the polymer solution. Infrared analysis showed the polymer contained less than 0.1% trans-unsaturation.

Six runs were made using the procedure shown above and the polymer solutions blended together in a 300 gallon tank. The polymer solution was extracted with 30 parts of a isopropanol/water 88/12 w/w solution and the polymer isolated by steam stripping. The fine polymer crumb was dried for 36 hours in a 80° C. vacuum tray drier.

The polymer crumb blended together gave a 243 lb. lot of material. This material was processed through a devolatilization twin-screw extruder at zone temperatures of 150° C.–300° C. to yield a 233 lb. lot of polymer in the form of clean, clear, colorless pellets. The polymer had the following physical properties: DSV =0.38, Tg =133° C., 0.2% residual weight loss at 450° C. and a melt flow of 50 gms/min.

EXAMPLE III

Degradation Results of Saturated and Unsaturated Polymers

Hydrogenated and non-hydrogenated polynorbornenes were prepared. Some of the polynorbornene was hydrogenated to provide a saturated sample. A 12.73 mg sample of hydrogenated polymer was provided and a 10.5 mg sample of non-hydrogenated (unsaturated) polymer was provided. The samples were subjected to various temperatures for equal times and the weight loss, (in percent) was calculated. The temperatures and results are set forth below.

|  | Saturated Wt. % Loss H672A | Unsaturated Wt. % Loss 672A |
| --- | --- | --- |
| 100° C. | 0.11% | 0.18% |
| 200° C. | 2.26% | 1.35% |
| 300° C. | 2.50% | 3.46% |
| 350° C. | 2.70% | 5.39% |
| 400° C. | 3.08% | 9.97% |
| 450° C. | 10.11% | 67.23% |

The results indicate that the saturated polymer exhibited significantly lower weight loss at elevated temperatures.

EXAMPLE IV

Molding of Polymer Into Discs

The saturated and unsaturated polymers of Example III were molded into discs having a diameter of about 2". The polymers were heated to a temperature of about 475° F. for about 5 minutes, cooled for 5 minutes and cold-pressed (71° F.) into discs having a diameter of about 2" and a thickness of about 0.028" for the nonhydrogenated polymer and about 0.012" for the hydrogenated polymer. The discs formed of hydrogenated polymer appeared to the unaided eye to be optically clear with the presence of some bubbles. The discs formed from the non-hydrogenated polymer were dark brown, not optically clear, i.e., could not be seen through, and appeared to have less structural integrity.

EXAMPLE V

Various blends of polynorbornene of example 1 and the polynorbornene of example 2 were prepared. The properties of the blends are listed below and demonstrate properties which would be expected of copolymers having the proportion of monomers indicated.

| Run | PNB of Ex I | PNB of Ex II | Melt Flow 300° C./1,200 g 10 min | Tg. °C. | Final Composition MTD % | MNB % | DCPD % |
|---|---|---|---|---|---|---|---|
| #1 | 100 | 0 | 28 | 150.6 | 90 | 0 | 10 |
| #2 | 90 | 10 | 35 | 148.7 | 90 | 1 | 9 |
| #3 | 75 | 25 | 36 | 145.9 | 90 | 2.5 | 7.5 |
| #4 | 50 | 50 | 40 | 142.6 | 90 | 5 | 5 |
| #5 | 25 | 75 | 45 | 137.7 | 90 | 7.5 | 2.5 |
| #6 | 10 | 90 | 49 | 136.3 | 90 | 9 | 1 |
| #7 | 0 | 100 | 50 | 134.5 | 90 | 10 | 0 |

EXAMPLE VI

Additional blends of polynorbornenes were prepared from what was designated as PNB-X and PNB-XIV. PNB-X is a polymer comprising 50% monomeric units of MTD and 50% monomeric units of DCPD. PNB-XIV is a polymer comprising 90% monomeric units of MTD and 10% monomeric units of MNB. Various tests were conducted to determine the following properties of the polymeric blends: melt flow, dilute solution viscosity, Tg and, values of various ratios of MTB, MNB and DCPD formulations. As indicated above, the behavior of these blends can be correlated to the behavior of the actual copolymer or terpolymer comprising repeating units of such monomers. The blends, composition of the blends and the measurements of the properties discussed above are set forth below.

| | Sample No.: | | | | | | |
|---|---|---|---|---|---|---|---|
| | 1 | 2 | 3 | 4 | 5 | 6 | 7 |
| PNB-10 | 100 | 80 | 60 | 40 | 20 | 10 | 00 |
| PNB-14 | — | 20 | 40 | 60 | 80 | 90 | 100 |
| Composition | | | | | | | |
| DCPD | 50 | 40 | 30 | 20 | 10 | 5 | 00 |
| MTD | 50 | 58 | 66 | 74 | 82 | 86 | 90 |
| MNB | — | 2 | 4 | 6 | 8 | 9 | 10 |
| Melt Flow* | 55 | 51 | 49 | 48 | 48 | 47 | 48 |
| Tg | 120.5 | 122.5 | 125.3 | 129.6 | 131.5 | 134.2 | 135 |
| D.S.V | 0.409 | 0.412 | 0.411 | 0.423 | 0.411 | 0.419 | 0.413 |
| Melt Flow** | 104.3 | 91.8 | 92.1 | 92.7 | 92.3 | 86.9 | 91.5 |
| % Melt Flow Increase | 90 | 80 | 88 | 93 | 92 | 85 | 91 |
| $M_n$ | 14700 | 14300 | 14000 | 14100 | 14200 | 13700 | 14000 |
| $M_w$ | 43000 | 41700 | 41700 | 41300 | 41700 | 40000 | 41600 |
| $M_w/M_n$ | 2.92 | 2.91 | 2.96 | 2.98 | 2.94 | 2.99 | 2.96 |

*gm/10 Min, 1200 gm load @ 300° C.
**2162 gm load @ 300° C.

Determination of Molecular Weight

The molecular weight ($M_w$) of the polymers was determined by using gel permeation chromatography (GPC). GPC is a powerful separation technique. The separation takes place in chromatographic columns filled with beads of a rigid porous "gel." The pores in these gels are of the same size as the dimensions of polymer molecules. A sample of a dilute polymer solution in cyclohexane is introduced into a solvent stream flowing through the column. As the dissolved polymer molecules flow past the porous beads, they can diffuse into the internal pore structure of the gel to an extent depending on their size and the pore-size distribution of the gel. Larger molecules can enter only a small fraction of the internal portion of the gel, or are completely excluded; smaller polymer molecules penetrate a larger fraction of the interior of the gel. The larger the molecule, the less time it spends inside the gel and the sooner it flows through the column. The different molecular species are eluted from the column in order of their molecular size as distinguished from their $M_w$, the largest emerging first. A plot of amount of solute versus retention volume can be converted into molecular-size distribution curves.

The gel permeation chromatography measurements are conducted on a chromatograph produced by Waters Associates, specifically a Waters Associates 150-CALC/GPC. This instrument contains five columns. The first four columns employ a PL gel mixed bed. The final column employs a PL 10 micron substrate. The columns are formed of copper tubing and have a dimension of 300 ×7.5 mm. The carrier solvent employed is toluene. The standard employed is polystyrene.

The sample is prepared by dissolving 0.08 grams of polymer in 3 ml. of cyclohexene. This mixture is then shaken overnight. The solution is then made up to 15 cc using toluene. The instrument is heated to 50° C. and is maintained at the speed of lcc/min. The sample is then submitted to the instrument.

What is claimed is:

1. A substantially optically clear molding composition produced by
    polymerizing a cycloolefin monomer in the presence of a catalyst effective to promote ring-opening polymerization to produce a polycycloolefin polymer; and
    hydrogenating the resultant polymer product to provide a polymer having a weight average molecular weight of from about $35-50 \times 10^3$ and a salt flow index of between about 40 to about 65 load, and g/10 min. as determined on a TINUS-OLSON melt-flow index system at 300° C. with a 1.2 Kg wherein the monomer comprises about 60-95% methyl-tetracyclododecene and about 90-5% dicyclopentadiene, based on the total weight of said mixture.

2. A substrate for an optical disc comprising a polycycloolefin of at least one norbornene monomer which has been hydrogenated subsequent to polymerization, said polymer having a weight average molecular weight of from about $37–47 \times 10^3$ as determined by gel permeation chromatography and wherein the monomer comprises from about 85-95% methyltetracyclododecene and about 15-5% methylnorbornene, based on the total weight of said mixture.

3. A substrate for an optical disc comprising a polycycloolefin of at least one norbornene monomer which has been hydrogenated subsequent to polymerization, said polymer having a weight average molecular weight of from about $37–47 \times 10^3$ as determined by gel permeation chromatography and wherein said monomer comprises from about 50% to about 95% methyltetracyclododecene, from about 0% to about 15% methylnorbornene and from about 0% to about 50% dicyclopentadiene.

4. A substrate of claim 3 wherein said monomer mixture comprises from about 50% to about 90% methyletetracyclododecene, from about 2% to about 10% methylnorbornene and from about 1% to about 40% dicyclopentadiene.

5. A substrate of claim 4 wherein said monomer mixture comprises from about 85% to about 90% methyltetracyclododecene, from about 3% to about 10% methylnorbornene and from about 2% to about 10% dicyclopentadiene.

6. A substrate of claim 3 wherein said monomer mixture comprises about 90% methyltetracyclododecene, about 7% methylnorbornene and about 3% dicyclopentadiene.

7. A substantially optically clear molding composition comprising a polycycloolefin which has been hydrogenated subsequent to polymerization, said polycycloolefin comprising a terpolymer derived from a mixture of monomers comprising from about 50% to about 95% methyltetracyclododecene, from about 0% to about 15% methylnorbornene and from about 0 to about 50% dicyclopentadiene.

8. A substantially optically clear molding composition of claim 7, comprising from about 50% to about 95% methyltetracyclododecene, from about 2% to about 10% methylnorbornene and from about 1% to about 40% dicyclopentadiene.

9. A substantially optically clear molding composition of claim 8 comprising about 85% to about 90% methyltetracyclododecene, from about 3% to about 10% methylnorbornene and from about 2% to about 10% dioyolopentadiene.

10. A substantially optically clear molding composition of claim 9 comprising about 90% methyltetracyclododecene, about 7% methylnorbornene, and from about 3% dicyclopentadiene.

11. Substrate for an optical disc comprising a molding composition of claim 7.

* * * * *

UNITED STATES PATENT AND TRADEMARK OFFICE
CERTIFICATE OF CORRECTION

PATENT NO. : 5,115,041
DATED : May 19, 1992
INVENTOR(S) : TENNEY et al.

It is certified that error appears in the above-identified patent and that said Letters Patent is hereby corrected as shown below:

Column 8, line 66, delete "Dicvclopentadiene" and insert therefor -- Dicyclopentadiene --.

Column 9, line 43, delete "Methvlnorbornene" and insert therefor -- Methylnorbornene --.

Column 12, line 57, delete "1cc/min." and insert therefor -- 1 cc/min. --.

Claim 1, line 9 (at column 12, line 68), delete "salt" and insert therefor -- melt --.

line 10 (at column 13, line 1), delete "load, and".

line 12 (at column, 13, line 3), after "Kg", insert -- load --.

line 14 (at column 13, line 5), delete "90" and insert therefor -- 40 --.

Claim 4, lines 2-3 (at column 13, lines 27-28), delete "methyletetracyclododecene" and insert therefor -- methyltetracyclododecene --.

UNITED STATES PATENT AND TRADEMARK OFFICE
CERTIFICATE OF CORRECTION

PATENT NO. : 5,115,041

DATED : May 19, 1992

INVENTOR(S) : Linwood P. Tenney, et al.

It is certified that error appears in the above-identified patent and that said Letters Patent is hereby corrected as shown below:

Claim 9, line 5 (at column 14, line 25) delete "dioyolopentadiene" and insert therefor -- dicyclopentadiene --.

Signed and Sealed this

Twenty-second Day of February, 1994

Attest:

BRUCE LEHMAN

Attesting Officer

Commissioner of Patents and Trademarks